April 12, 1966  J. R. SUTTON  3,245,658

OFFSHORE PLATFORM ELEVATING EQUIPMENT

Filed April 12, 1965  7 Sheets-Sheet 1

INVENTOR.
JOHN R. SUTTON

BY  ATTORNEYS.

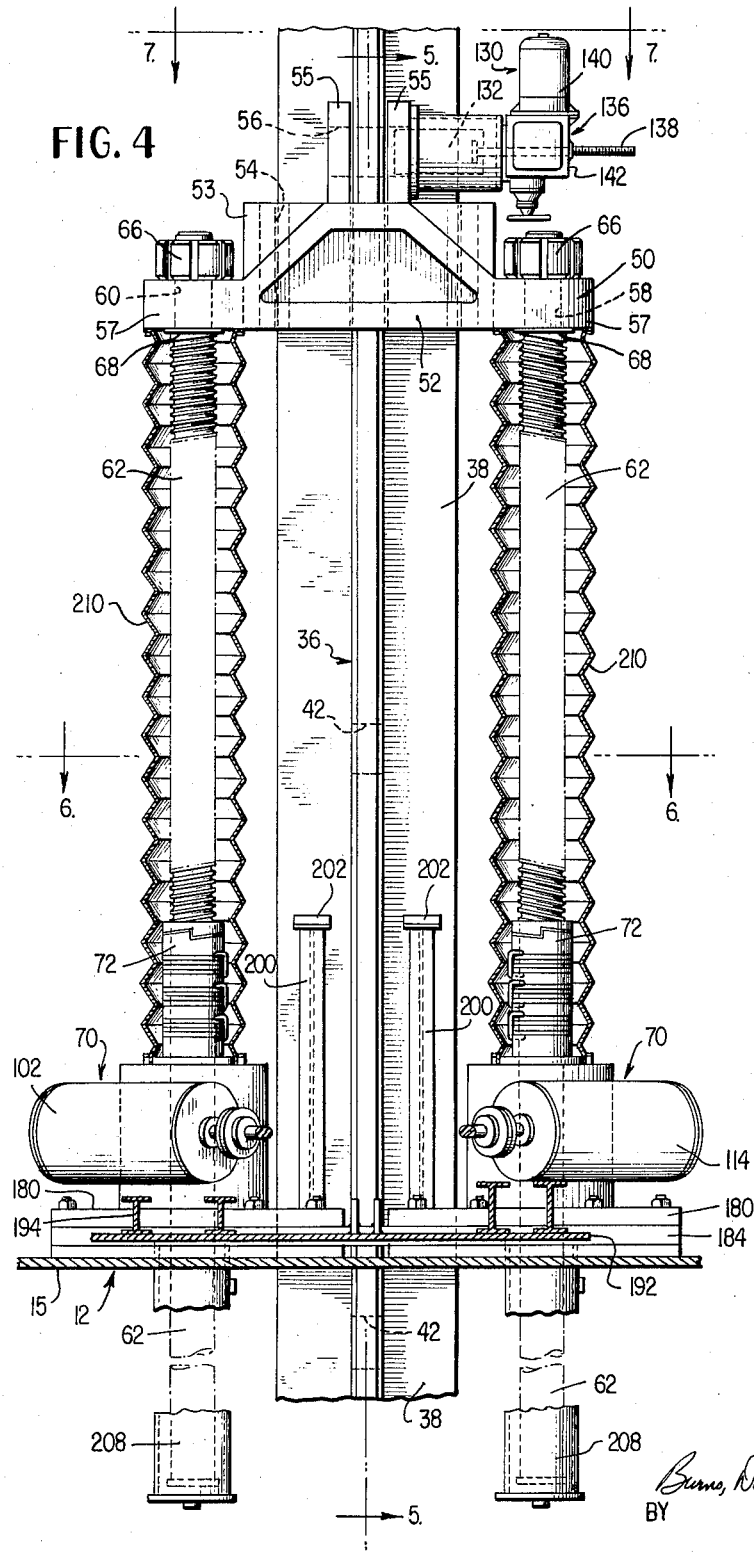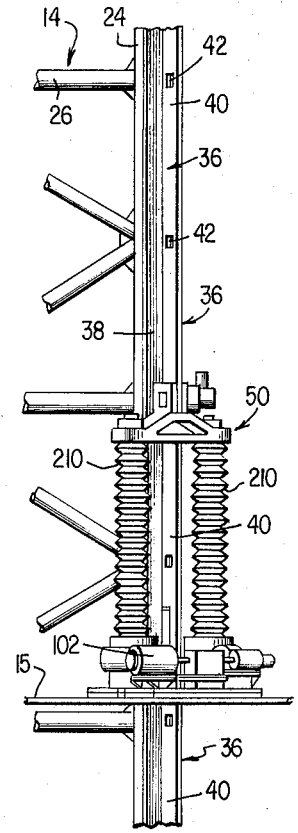
INVENTOR.
JOHN R. SUTTON

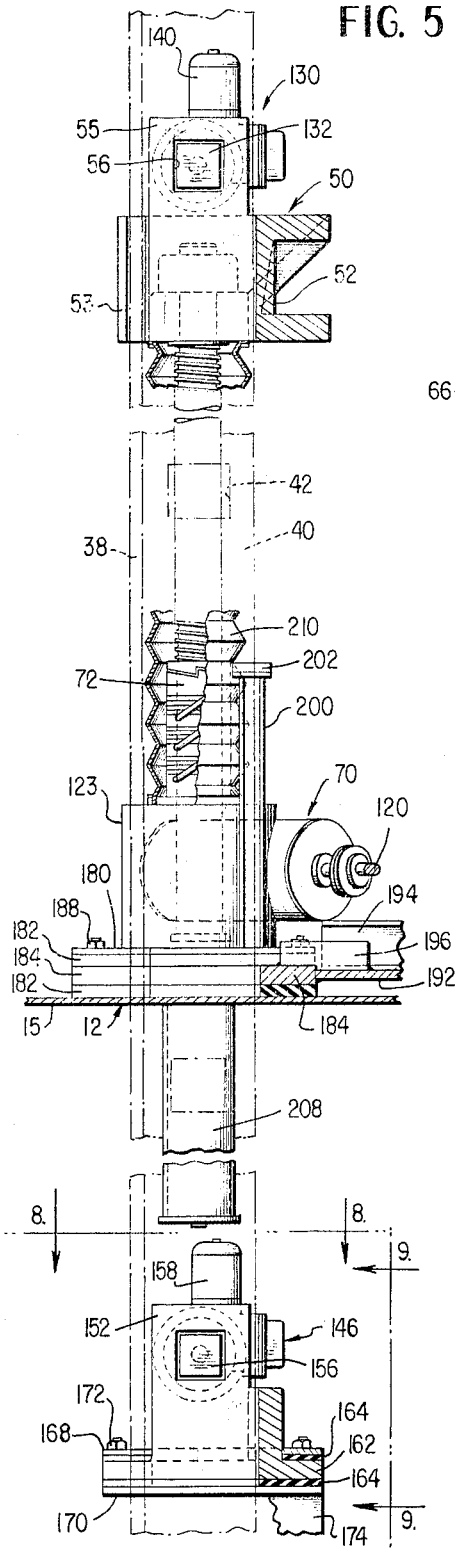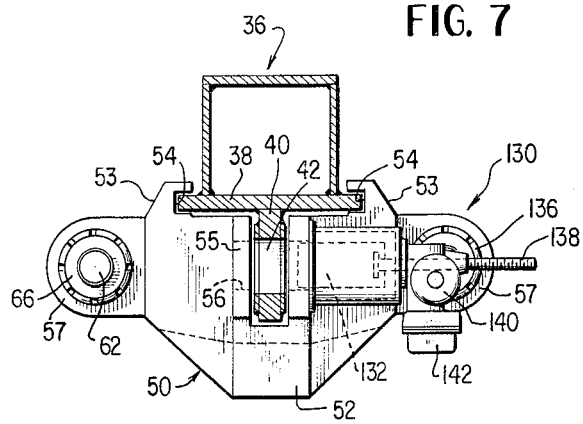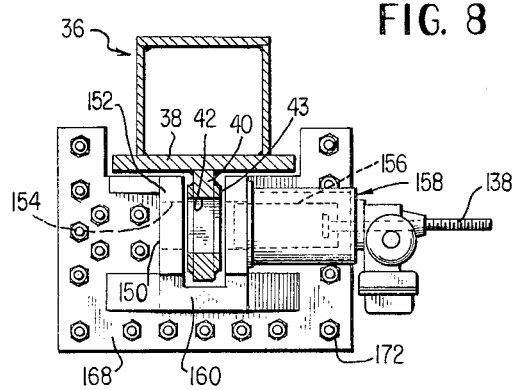

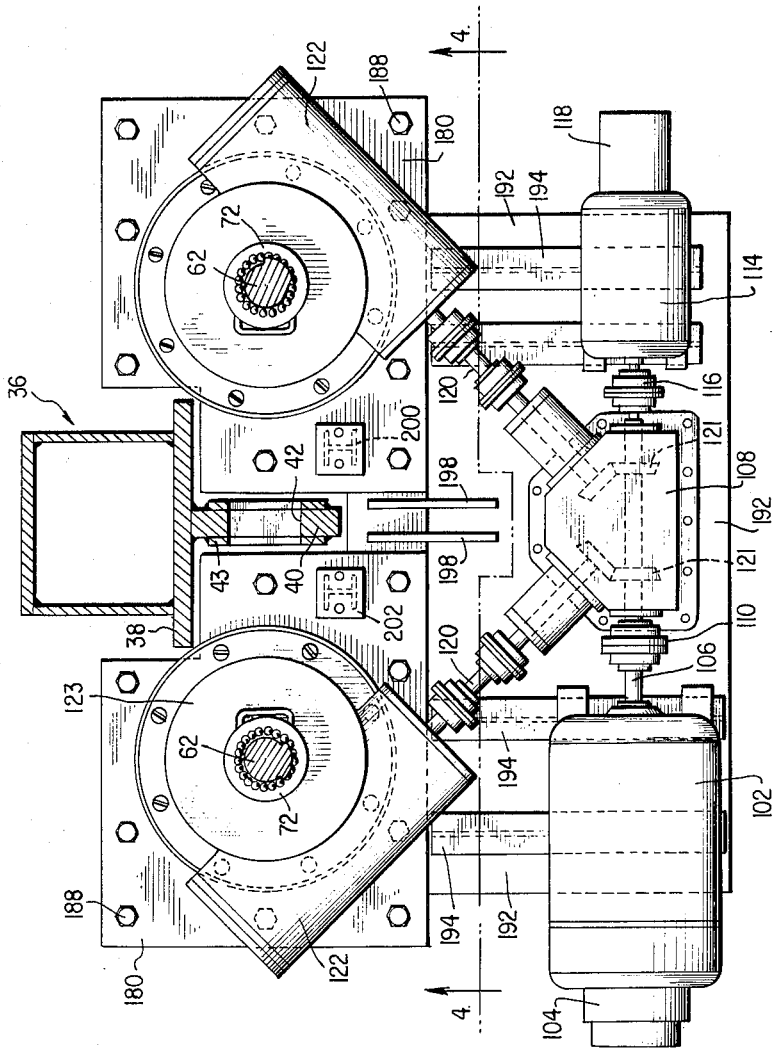

April 12, 1966 J. R. SUTTON 3,245,658
OFFSHORE PLATFORM ELEVATING EQUIPMENT
Filed April 12, 1965 7 Sheets-Sheet 5
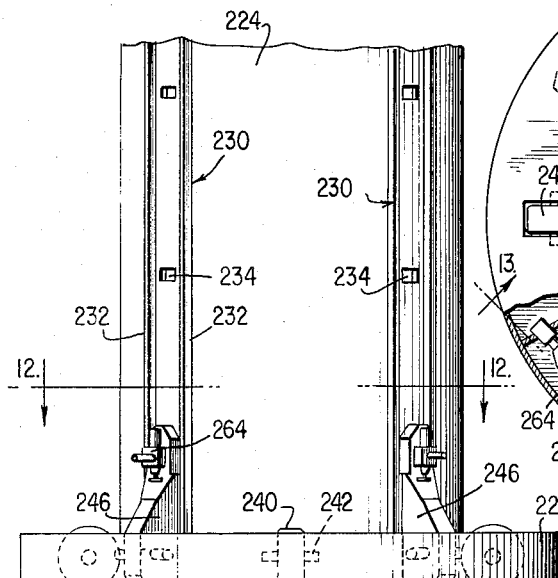
FIG. 10
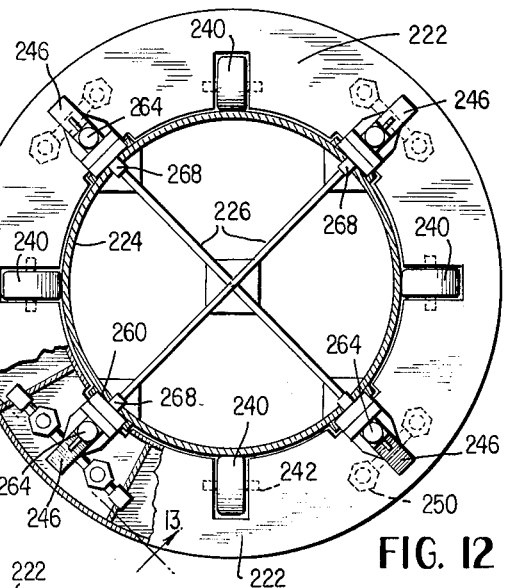
FIG. 12
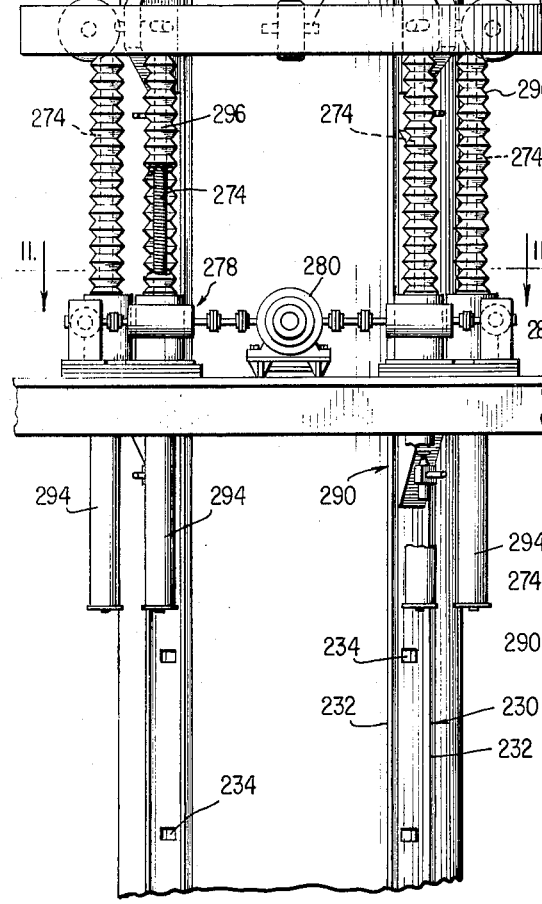
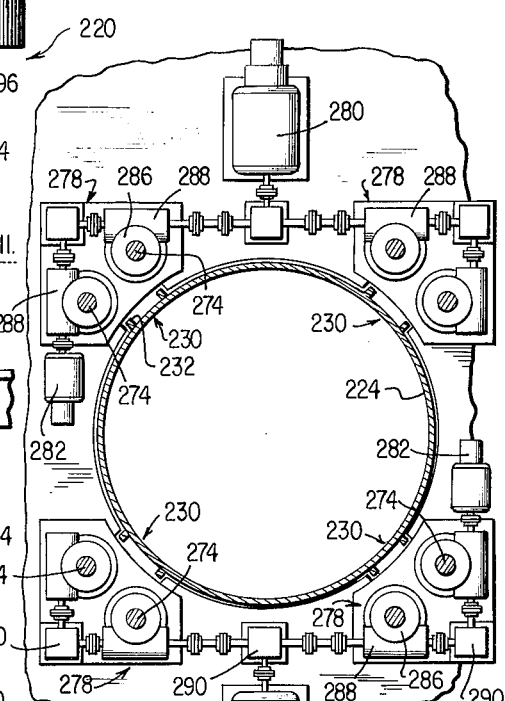
FIG. 11
INVENTOR.
JOHN R. SUTTON
BY ATTORNEYS.

April 12, 1966  J. R. SUTTON  3,245,658
OFFSHORE PLATFORM ELEVATING EQUIPMENT
Filed April 12, 1965  7 Sheets-Sheet 6
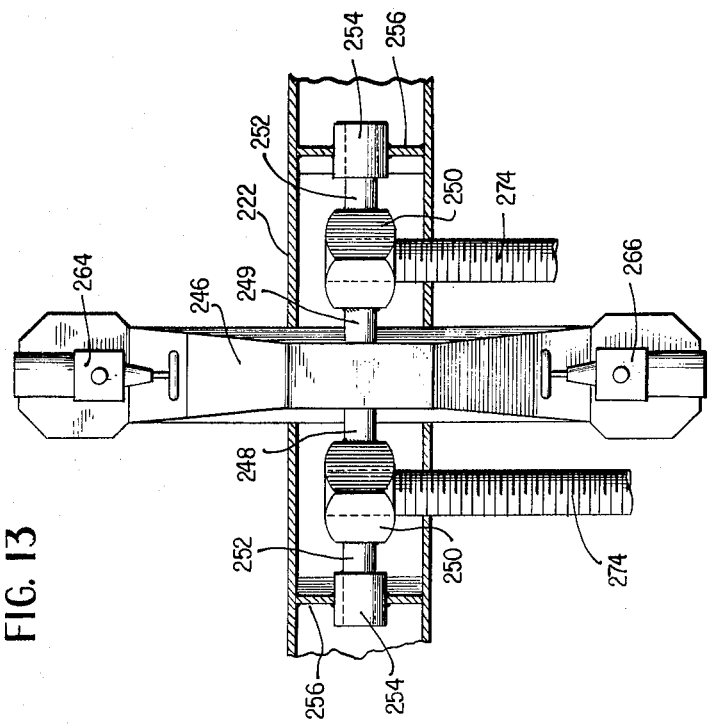
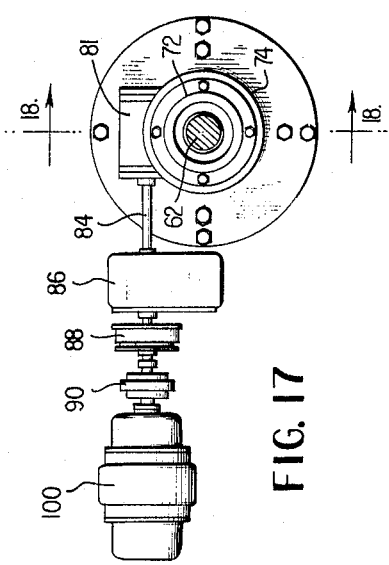
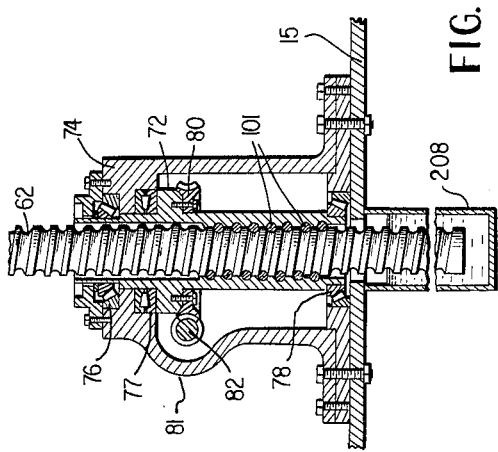
INVENTOR.
JOHN R. SUTTON
BY
ATTORNEYS.

April 12, 1966  J. R. SUTTON  3,245,658
OFFSHORE PLATFORM ELEVATING EQUIPMENT
Filed April 12, 1965  7 Sheets-Sheet 7

INVENTOR.
JOHN R. SUTTON
BY *Burns, Doane, Benedict, Swecker, & Mathis*
ATTORNEYS.

United States Patent Office 3,245,658
Patented Apr. 12, 1966

3,245,658
OFFSHORE PLATFORM ELEVATING
EQUIPMENT
John R. Sutton, 1189 Calder Ave., Beaumont, Tex.
Filed Apr. 12, 1965, Ser. No. 447,195
11 Claims. (Cl. 254—105)

This application is a continuation-in-part of co-pending application Serial No. 24,120, filed April 22, 1960 now patent No. 3,201,945. This invention relates to offshort platform equipment of the type shown in my prior Patents No. 2,900,794; No. 2,979,911; and No. 3,082,607. In this type of equipment, a barge is towed to an offshore location and elevated above the surface of the water to serve, for example, as a radar platform, or as a platform for supporting equipment for oil well exploration or production or oil well servicing. A barge of this type has a number of columns or vertically extending members for supporting the barge in an elevated position. The barge serves as the buoyant means for the columns during the towing of the equipment across the water. Normally, the columns are raised with respect to the barge during the towing operation; then at the site where the platform is to be erected, the columns are lowered until they make contact with and bear upon the floor of the body of water. Once the columns are firmly established, the barge structure is raised on the columns to an elevation above the wave action. Relative movement between the columns and the barge is achieved by means of jacking apparatus mounted on the barge and operable to cause the columns to move with respect to the barge, or the barge with respect to the columns.

This invention is directed primarily to this type of jacking apparatus. Such apparatus has special requirements. Among other things, it must be capable of accommodating extremely heavy loads and yet have a relatively fast action. Control of the jacking operation at all times is essential, and similarly, safety or emergency situations must be provided for. The apparatus must be strong enough to withstand twisting and distorting forces caused by wind and wave action, yet simplicity in the structure is significant because of weight factors.

The primary object of this invention is to provide improved jacking apparatus for effectively causing relative vertical movement between columns and barge structure for achieving the requirements explained above and for overcoming many undesirable drawbacks frequently encountered in conventional jacking apparatus, particularly hydraulically actuated jacking apparatus.

In general, the jacking apparatus of this invention includes a separate jacking assembly for each column. Each jack assembly is mounted on the barge and is engageable and disengageable with the corresponding column. Each jacking assembly normally includes three or more jacking units operable in unison. Each jacking unit, according to this invention, includes a pair of spirally grooved, ball screw shafts of considerable length which in effect are attached to the barge and which are caused to be moved in either vertical direction by a power drive assembly. Connection between the shafts and the drive assembly is made by ball screw nuts through which the shafts extend and which are rotatably driven by the drive assembly to cause vertical movement of the shafts. The shafts in turn cause vertical movement in either direction of a column engagement assembly fixed between the two shafts and which can be connected or disconnected with respect to the corresponding column. The column engagement assembly cooperates with and is guided by tracks fixed on the column. Power operated locking pins on the column engagement assembly are movable into and out of engagement with the track, and these serve as the connecting elements to fixedly engage the column engagement assembly with the column. The ball screw shafts, the locking pins, particular portions of the column engagement assembly and the tracks are effectively arranged, as will be described in detail, for maximum efficiency in order to handle the forces encountered due to the weight of the structures involved.

Details of the invention and modifications are illustrated in the accompanying drawings, in which:

FIGURE 3 is a fragmentary elevation view showing parts of a column and a jacking unit;

FIGURE 4 is an enlarged elevation view of a jacking unit and showing portions of a column and a barge deck;

FIGURE 5 is an elevation view in cross-section of the jacking unit of FIGURE 4 taken along line 5—5;

FIGURE 6 is a horizontal cross-section view of the jacking unit of FIGURE 4 taken along line 6—6;

FIGURE 7 is a horizontal cross-section view through the track on a column taken along line 7—7 of FIGURE 4;

FIGURE 8 is a horizontal cross-sectional view taken along line 8 of FIGURE 5;

FIGURE 9 is a side elevation view of that portion of a jacking unit designated by line 9—9 of FIGURE 5;

FIGURE 10 is a side elevation view of a modified jacking assembly showing a portion of a column;

Figure 14:
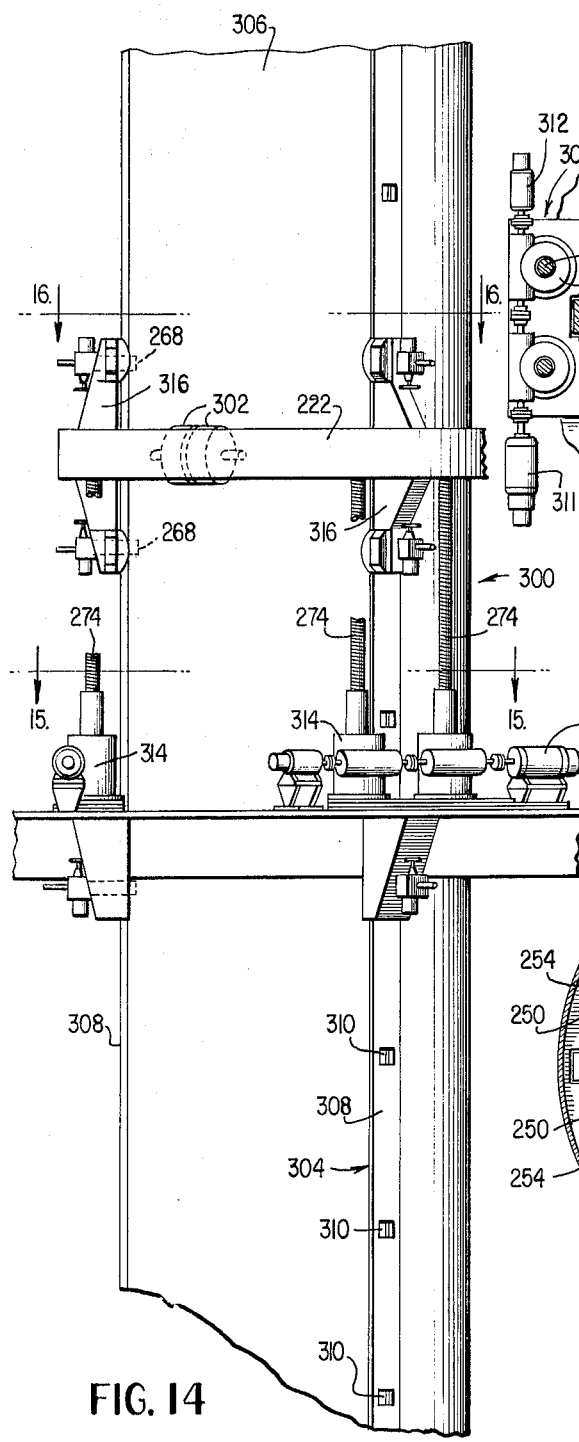
Figure 15:
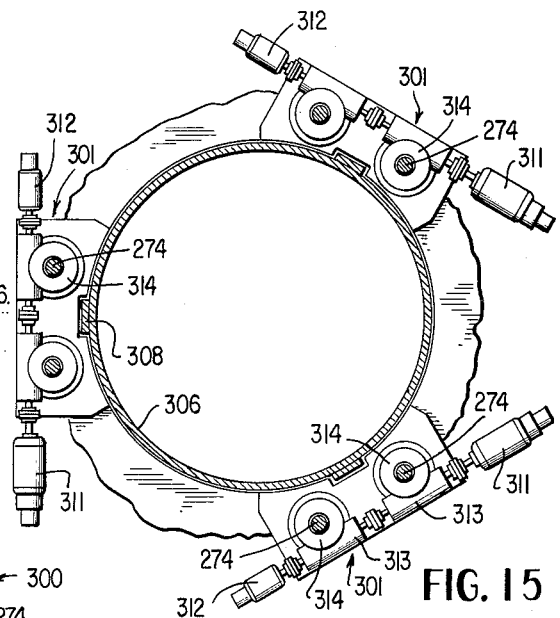
Figure 16:
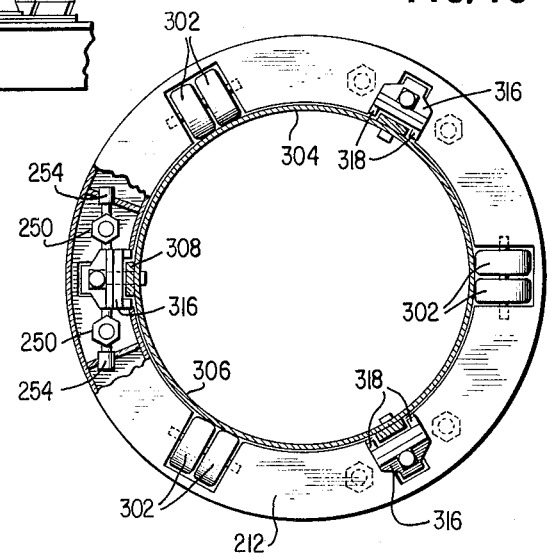

FIGURES 11 and 12 are horizontal cross-section views taken along lines 11—11 and 12—12, respectively, of FIGURE 10;

FIGURE 13 is a side elevation view in cross-section taken along line 13—13 of FIGURE 12 showing details of the column engagement assembly;

FIGURE 14 is a side elevation view of another modification of a jack assembly showing a portion of a column;

FIGURES 15 and 16 are horizontal cross-section views taken along lines 15—15 and 16—16, respectively, of FIGURE 14;

FIGURE 17 is a plan view of a typical drive assembly showing the ball screw shaft in cross-section; and FIGURE 18 is a side elevation view in cross-section taken along line 18—18 of FIGURE 17.

Figure 1:
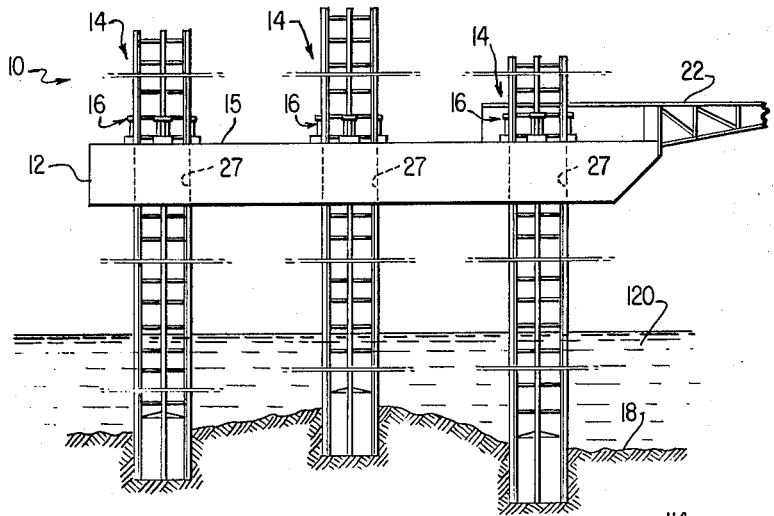
FIGURE 1 is a side elevation view of representative offshore equipment with a platform established at an elevated position over a body of water.

The offshore platform equipment of the general type to which this invention relates is illustrated diagrammatically in FIGURE 1. The offshore equipment 10 includes a floatable barge 12 with a number of columns or vertically extending support towers 14 supported generally upright with respect thereto and passing through the deck 15 of the barge. A separate jacking assembly 16 is provided for each column 14 and when actuated effects relative vertical movement between the corresponding column 14 and the barge 12. An offshore platform is established by floating the equipment 10 to the desired offshore site, usually with the several columns 14 raised and extending a considerable distance above the barge 12. At the site, the several jacking assemblies 16 are actuated to lower the columns 14 until the columns become firmly embeded on the body bottom 18 of the body of water 20. Continued operation of the jacking assemblies 16 raises the barge 12 above the surface of the body of water 20 to an elevation where the barge is above the wave action of the water. A helicopter pad and well drilling and servicing equipment, as necessary, may be located on the barge 12, which serves as the offshore platform. The barge itself may be of such dimensions to contain different levels and compartments. In the event the offshore equipment 10 is used to service existing wells, a traveling platform 22 may be provided for carrying derrick structure over the existing well equipment. Any machinery, materials, and supplies, as necessary for carrying out well drilling and well servicing operations, may be provided on the barge 12.

Figure 2:
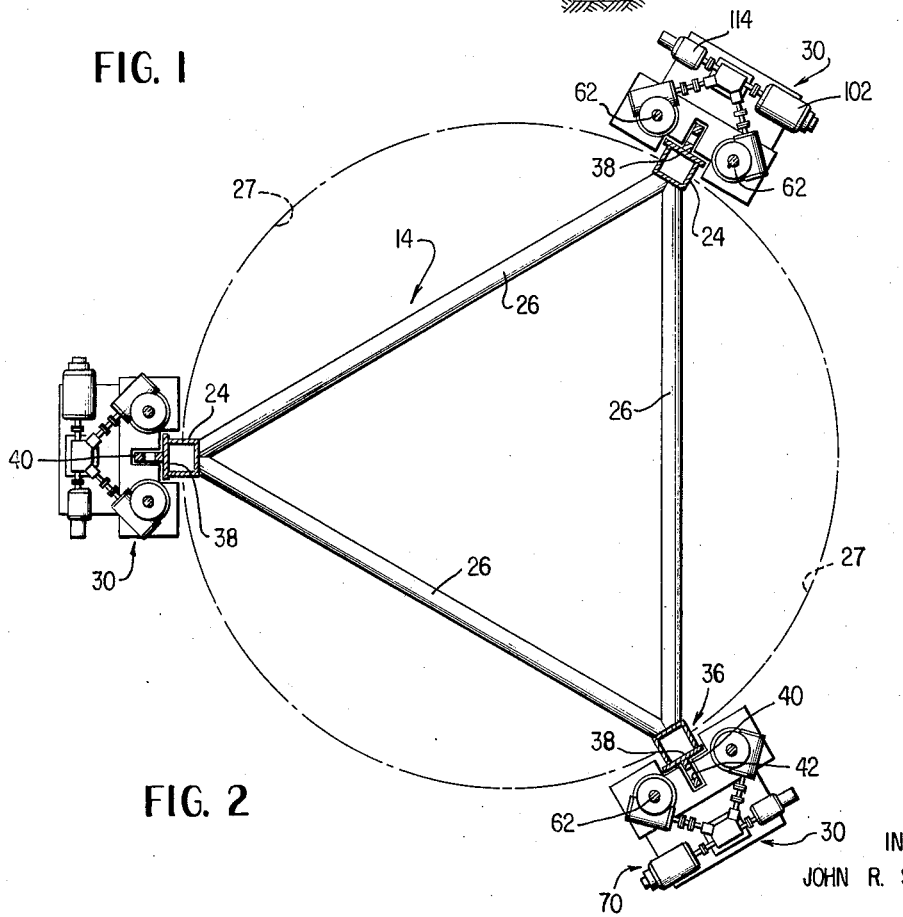
FIGURE 2 is an enlarged horizontal cross-section view of a column showing a jacking assembly, with three jacking units.

This invention is concerned primarily with a jacking system which serves to connect the columns 14 with the barge 12 and to effect vertical movement with respect thereto. Various structures serving as the columns 14 may be employed; for example, the columns 14 may be built upon of vertically exteding members 24 reinforced by a series of horizontally extending members 26, braced as necessary (FIGURE 2). The columns also might be constructed of a cylindrical shell rather than being built up of vertical and horizontal members. Ordinarily the columns pass through a hole or well 27 within the confines of the barge. The jacking system of this invention may be used with a variety of differently constructed columns and barges.

The jacking system for the offshore equipment 10 includes one independent jacking assembly 16 for each column, and each jacking assembly includes a number of jack units 30. The several jack assemblies are operable independently of one another to lower the columns to different depths because of the varying contour of the floor, as shown in FIGURE 1, for example, and also to level the barge 12. The jacking units 30 also may be operated independently of the other units of each jacking assembly 16 in order to straighten a column, for example, but normally they are operated in unison.

Vertical members 24 of the column 14 have a vertically extending track 36 fixed thereto. Although the vertical members 24 shown in FIGURE 2, for example, are rectangular in cross-sectional configuration, the particular shape as far as the packing system is concerned is not significant. The track 36 in this case includes a plate member 38 attached to the vertical member 24 and a rail 40 having one edge attached to the plate 38 and extending radially with respect to the column 14. A series of spaced-apart openings 42 are provided throughout the vertical length of the rail 40 and may be rectangular, as shown in FIGURES 3 and 5, or circular if desired. Preferably the portions around the openings 42 are reinforced as at 43 (FIGURES 6, 7 and 8).

Although openings 42 (for receiving pins) are described, other means may be used as well. Different types of lugs, or teeth, or wedging devices might be employed, as will be apparent from the description below.

Each jacking unit 30 has a column engagement member or cross head 50 which is slidable along and guided by the corresponding track 36. Each cross head 50 has a suitably strong central portion 52 with inwardly extending leg portions 53 (FIGURE 7) providing vertically extending elongated grooves 54 adapted to receive the two opposite edges of the plate 38 of the track 36. Spaced-apart lugs 55 extending upwardly from the central portion 52 form a clevis-like arrangement through which the rail 40 of the track 36 extends (FIGURE 7). Aligned openings 56 in each lug 55 are approximately of the same shape and dimensions as the holes 42 in the rail 40. At each opposite side of the central portion 52 of each cross head 50 are extensions 57 with holes 58 extending vertically therethrough to receive the upper end of a ball screw shaft 62. The upper end of the shafts 62 are somewhat smaller in diameter than the main portion of the shafts. The two shafts 62 are fixed against vertical movement with respect to the cross head 50 by spanner nuts 66 each cooperating with a washer 68 set against the main diameter portion of the shaft and drawn against the bottom surface of the cross head 50.

The two ball screw shafts 62 extend downwardly from the cross head 50 to a drive assembly 70. At the drive assembly 70, each shaft 62 extends through a ball screw nut 72 of the type illustrated, for example, in co-pending application Serial No. 24,120 now Patent No. 3,201,945. The shafts 62 are spirally grooved to receive the balls of the ball screw nut 72. Rotation of the ball screw nut 72 by the drive assembly 70 serves to raise and lower the corresponding shaft 62; that is, move the shaft 62 in a vertical direction through the ball screw nut 72. The ball screw nuts can be rotated in either rotational direction to raise or lower the shaft as desired. Preferably, the ball screw nuts of each unit 30 are rotated in opposite directions to cause movement of the cross head 50 in one direction.

At this point in the explanation of the drive assembly 70, reference to FIGURES 17 and 18 will serve to illustrate the relationship between the ball screw shafts 62 and the ball screw nuts 72. The ball screw nut 72 is rotatably mounted in a suitable housing 74 by means of bearing assemblies 76, 77 and 78. A gear 80 is fixed to the ball screw nut 72 and, within the worm gear box 81, cooperates with a worm gear 82 on a shaft 84. For purposes of illustration, the shaft 84 is shown as connected with a gear box 86, which in turn is drivingly connected through a clutch 88 and a coupling 90 with a motor 100. When the motor 100 is operated to drive the worm gear 82, the ball screw nut 72 is rotated. The series of balls 101 associated with the ball screw nut effect vertical movement of the shaft 62 either upwardly or downwardly, depending on the direction of rotation of the ball screw nut 72. The balls serve to reduce the friction, and, at the same time, are capable of accommodating exceedingly heavy loads. Moreover, relative movement between the shaft 62 and the nut 72 will not occur unless the nut itself is rotated. This provides a highly desirable safety feature.

The drive assembly 70 illustrated in FIGURE 6, for example, includes a main drive electric motor 102 having an electric brake 104. The output shaft 106 of the motor 102 is connected to a gear box 108 through a coupling 110. A rapid traverse electric motor 114 is positioned for driving connection with the gear box 108 opposite the main drive motor 102 and is connected therewith through a coupling 116. The rapid traverse motor 114 has an electric brake 118. Hydraulic motors, air motors, internal or combustion engines could be used as a source of power as well as the electric motors; however, electric motors are preferred.

A pair of shafts 120 extend from bevel gears 121 in the box 108 to gear boxes 122 having worm gears which in turn are connected with the ball screw nuts 72, in the manner described in connection with FIGURES 17 and 18, for driving the ball screw shafts 62. Suitable bearings serve to secure the ball screw nuts to the housings 123 for rotational movement but which prevent vertical movement.

The main drive motor 102 is sufficiently powerful to cause rotation of both of the ball screw shafts 62 to raise or lower the columns 14 with respect to the barge 12 or to raise the barge 12 with respect to the columns 14, when the cross heads 50 are engagement with the track 36. The rapid traverse motor 114 is somewhat less powerful than the main drive motor 102 but is capable of rotating the ball screw nut 72 at a considerably greater r.p.m. than the main drive motor 102 in order to move the cross head 50 up and down rapidly for the purposes of carrying out a rapid step-by-step jacking operation.

Connection between the cross head 50 and the rail 40 of the track 36 is accomplished by a latch assembly 130 (FIGURES 4 and 7) mounted on the cross head 50. Each latch assembly 130 includes a latch pin 132 slidable horizontally toward and away from the rail 40 so that it may enter or leave any one of the openings 42 in the rail 40 and the aligned openings 56 in the lugs 55. Movement of the pin 132 is caused by an actuator 136 which, for example, might include a threaded rod 138 connected with the pin 132 and propelled back-and-forth by a rotating worm gear mechanism 140 operated by a fluid or electrically driven motor 142.

A similar latch mechanism 146 (FIGURES 8 and 9) is fixed to the barge 12 below the deck 15 and is mounted upon a clevis assembly 150 fixed to the barge structure to be immovable with respect thereto. The clevis assembly 150 includes spaced-apart lugs 152 forming a clevis-like structure to receive the rail 40 of the track 36 in the same manner as the lugs 55 of the cross head 50 receive the rail 40. The lugs 152 are provided with holes 154 approximately the same size and shape as the holes 42 in the rail 40. A pin 156 of the latch mechanism 146 is slidable back-and-forth by an actuator 158 and may extend through the holes 154 in the clevis members 152 and the holes 42 in the rail 40 when aligned, similar to the operation of the actuator assembly 130.

A shock reducing mounting is provided for connecting the clevis assembly 150 to the barge structure. The clevis member 150 has a horizontally extending plate 162 which is sandwiched between flexible shock pads 164. A cover plate 168 extends over the upper shock pad 164 and is held to a plate 170 by means of a number of bolts 172. The plate 170 is fixed to the barge structure by means of suitable bracing 174, for example.

The drive assembly 70 also is mounted to the deck 15 of the barge, or to a similar portion of the barge, by a shock reducing arrangement including an assembly comprising an upper plate 180 to which is fixed the housing 123 for the ball screw nuts, and a pair of flexible shock pads 182 between which is sandwiched a spacer plate 184. This assembly is bolted to the deck and held firmly with respect thereto by means of a number of bolts 188. A plate somewhat thinner than the spacer plate 184 is fixed to the plate 184 and extends away from the column 14 in cantilever fashion. Plate 192 supports the main drive motor 102, the rapid traverse motor 114, and the gear box 108. I-beam members stiffen the plate 192, and the connection between plates 184 and 192 is strengthened by stiffeners 198.

A pair of vertically extending bumpers 200 are fixed on the plate 180 in the path of the cross head 50. Flexible pads 202 are fixed to the top of the bumpers 200 which act to limit downward movement of the cross head 50 with respect to the deck for preventing engagement of the cross head with the power assembly 70 as a safety precaution.

Oil bath tubes 208 extend downwardly beneath the deck for receiving the portion of the shafts 62 below the ball screw nuts 72. These tubes contain oil or lubricant for the ball screw nuts 72. A flexible neoprene boot 210 may cover the upper portions of each shaft 62 between the power assembly 70 and the cross head 50. The boot 210 serves to protect the shaft from dirt and salt water, and otherwise enhances smooth operation of the jacking assembly. Guide structure is provided, as necessary, on the barge to keep the column properly aligned during movement through the wells 27.

Operation of the jacking assembly 16 is as follows. Assuming that the offshore equipment 10 is at the site where it is to be erected, the columns 14 normally will be held in a raised position by the lower latch assemblies 146 with the pins 156 thereof extending through one of the holes 42 in the rail 40 of the corresponding track 36. Also, the cross heads 50 can be moved into position so that the upper latch assemblies 130 will be aligned for entry of the pins 132 thereof into the corresponding holes 42 to assist in securely holding the columns 14 in fixed position with respect to the barge 12 during the towing operation.

When the columns 14 are to be lowered to the bottom of the body of water, each jacking assembly 16 is actuated independently of the other as necessary. The column engaging members of each assembly 16, that is the cross heads 50, are normally operated in unison as by a single control to run the motors of each assembly 16.

To lower any one of the columns 14, the lower latch assemblies 146 remain connected with the tracks 36 to hold the column 14 against movement with respect to the barge. The upper latch assemblies 136 are released. The rapid traverse motors 114 are actuated to move the cross heads 50 upwardly as far as the ball screw shafts 62 will allow. The upper latch assemblies 130 are then connected with the tracks 36 by proper actuation of the latch actuators 136 to insert the pins 132 in one of the holes 42 of the rails 40. The lower latch assemblies 146 are then released by withdrawing the pins 156. This transfers the weight of the column 14 to the cross heads 50 and in turn puts the shafts in compression. It may be necessary to operate the motors 102 to move the cross heads 50 upwardly slightly in order to transfer the weight. The motors 102 are then actuated to cause the cross heads 50 to move downwardly under control of the main drive motors 102. This lowers the column 14 with respect to the barge. Relative movement will occur only when the motors 102 are operated to rotate the ball screw nuts.

The ball screw nuts 72 do not allow rotation of the ball screw shafts 62 no matter how much vertical force is applied to the cross heads 50. Downward movement of the cross heads 62 is allowed only by rotation of either one of the motors 102 or 114 which positively drive the ball screw nuts 72. This provides a tremendous advantageous safety feature not ordinarily accomplished by conventional jacking devices. Since movement of the columns with respect to the barge is a potentially dangerous operation, it is important that movement of the columns be kept under close control. It is also highly important that movement of the columns with respect to the barge and the subsequent raising of the barge on the columns be accomplished as rapidly as possible at the appropriate time. The jacking assemblies of this invention are highly advantageous in this respect and provide the necessary safety features and control over movement of the columns and barge.

Downward movement of the cross heads 50, while the upper latch assemblies 136 are connected with the columns, continues thereby lowering the column 14 with respect to the barge until the bottom of the cross heads approach the bumpers 200. At this point, one of the holes 42 in the rail 40 of the tracks 36 will be aligned approximately with the pins 156 of the lower latch assemblies 146 so that, upon actuation of the lower latch assembly actuators 158, the pins 156 will move through the corresponding holes 42 and serve to connect the column with the barge.

The pins 132 of the upper latch assemblies 130 are then released. The rapid traverse motors 114 are then actuated to raise the cross heads 50 the full extent of the ball screw shafts so that the upper latch assemblies 130 again may connect the column 14 to the barge and another lowering phase of the columns can be accomplished. This step-by-step lowering of the column 14 is continued until it engages the bottom 18 and becomes firmly embedded.

After the several columns are lowered, the barge 12 is then raised upon the columns in somewhat the same step-by-step fashion, although the forces are different. The cross heads 50 are raised the full extent of the ball screw shafts. The upper latch assemblies 130 are actuated to connect the barge to the column. After the lower latch assemblies 146 are released, the main drive motor 102 is actuated to rotate the ball screw nuts 72 thereby, in effect, running the ball screw nuts 72 up the stationary shaft 62 and pulling the barge up to the cross heads 50. At this point in the operation of the jacking assemblies 16, the barge 12 is hanging on the columns 14 through the jacking units 30. The shafts 62 in this instance are in tension. As soon as a full stroke upward has been completed, the lower latch assemblies 146 are actuated to connect the barge to the columns. The upper latch assemblies 130 are released. The rapid traverse motor 114 is actuated to raise the cross heads 50; and once again, the upper latch assemblies 130 are actuated to connect the cross heads with the columns. The main drive motors 102 are actuated again to pull the barge 12 up the columns 14.

The forces applied to jacking apparatus of this type during a column lowering operation or a barge raising operation are extremely severe. Wave action and wind action cause distortion, twisting and unusual load characteristics. Jacking apparatus, in this environment, must be able to overcome the severe stresses applied and also must be stable, strong and powerful enough to accomplish the necessary relative movements between the columns and the barge. These features are accomplished in part by the use of the two ball screw shafts 62 located on opposite sides of the rail 40 therebetween. From FIGURES 5, 6 and 7 is can be seen that the shafts 62, the rail 40, the holes 42 therethrough, and the upper and lower latch assemblies all are in alignment generally in a vertical plane. The use of two ball screw shafts 126 associated with one rail serves to balance and distribute the forces equally to the two shafts 62. Torsional and twisting forces are eliminated or minimized, and the shafts 62 are either in compression or tension applied axially through the shafts. The use of a single motor, either the rapid traverse motor or the main drive motor, which are used alternately one at a time through a single gear box, provides for equal movement to further avoid distorting forces between the columns and the barge. The ball screw nuts of each unit 30 preferably are rotated in opposite directions, with respect to FIGURE 6, for example, and as represented by the slant of the grooves in the shafts as shown in FIGURE 4.

The connections between the columns and the barge are totally mechanical, as compared with hydraulic. This attributes to the simplicity of the jacking apparatus of this invention, and as a result, vastly reduces construction and maintenance costs.

When it is desired to move the offshore equipment 10 to a new location, the barge 12 is lowered to the surface of the body of water, and the columns 14 are raised. The jacking assemblies are operated in step-by-step fashion to accomplish this in the appropriate manner. The barge 12 can be towed to a new site and the column lowering operation and the barge raising operation repeated. This establishes the offshore equipment 10 at the new site for a well drilling or a well treating operation as desired.

A modified jacking assembly 220 is illustrated in FIGURES 10, 11 and 12. The concept of the use of ball screw nuts with a pair of ball screw shafts in association with a single track is employed to gain the advantages previously described. In the modified jacking assembly 220, a yoke 222 is used as the column engaging member instead of the separate cross heads 50 previously described. The column 224 in this instance is of cylindrical shell construction which may be strengthened throughout its length by internal bracing member 226. The outside of the column 224 is provided with separate tracks 230, each of which is formed by a pair of guides or ribs 232 extending the length of the column 224 and spaced circumferentially on the outside of the column. A series of spaced-apart holes 234, corresponding with the holes 42, described in connection with the track 36, are located between each pair of ribs 232.

The yoke 222 has rollers such as rubber tires 240 mounted thereon for engagement with the outer periphery of the column 224. Each roller 240 is mounted for rotation on an axle 242 journaled to a portion of the yoke 222. The rollers 240 serve to position the yoke 222 and to allow smooth relative movement between the yoke 222 and the column 224 and to prevent binding.

Jack heads 246 (FIGURE 13) have fixed thereto stub axles 248 extending from opposite sides. The stub axles 248 in turn are connected to nuts 250 with outer stub axles 252 aligned axially with the main stub axle 240 and extending farther from the head 246 and in turn rotatable in journals 254 fixed to the yoke 222 by means of suitable bracing structure 256. The head 248 and the nuts 250 can rotate about the longitudinal axis of the combined axles 248 and 256. In this manner, the heads and the nuts 250 are rotatably fixed to the yoke 222. The jack heads 246 extend upwardly and downwardly beyond the top wall and the bottom walls of the yoke 222 and are dimensioned to fit within the pair of ribs 232 of the track 230. The inner face of each head 246 may slide along the track surface between the ribs 232, and the four heads 246 together, as shown in FIGURE 12, prevent rotational movement of the yoke 222 about the column 224.

A pair of latch assemblies 264 and 266 are attached to the upper and lower ends of each head 246 and each have a pin 268 extendable and retractable radially with respect to the column 224 for movement into or out of the holes 234 in the tracks 230. The spacing between the several holes 234 corresponds with the spacing between the latch pins 268 of the latch assemblies 264 and 266. When the pins 268 are moved to their extended or inward position, the heads 246, and hence the yoke 222 is connected with the column 224; and when the pins are retracted, relative vertical movement between the yoke 222 and the column 224 may take place.

A ball screw shaft 274 is fixed to each of the nuts 250 and extends downwardly therefrom to a drive assembly 278. The drive assembly arrangement for the jacking assembly 220 employs a single main drive motor 280 to drive two pair of ball screw shafts 274, as shown in FIGURE 11. A single rapid traverse motor 282 likewise may be used to drive two pair of shafts 274. The shaft 274 extends through a ball screw nut 286 arrangement, each of which has an associated worm gear box 288 for rotating the corresponding nut 286 as described in connection with FIGURES 17 and 18, for example, and the preceding embodiment. Suitable gear boxes 290 are provided as necessary to complete the driving connections.

Lower pin latch assemblies 290 are fixed to the barge beneath the drive assembly 278 and positioned to engage each track 230. The lower pin latch assembly 290 includes a pin (not shown) movable radially with respect to the column 224 into and out of the holes 234 in a similar manner as described in connection with the lower pin latch assemblies 146.

Oil bath tubes 294 receive the lower ends of the shafts 274 and contain oil for lubricating the shafts and the ball screw nut. Collapsible boots 296 made of neoprene or the like cover the upper portions of the shafts 274.

Operation of the jacking assembly 220 for causing relative vertical movement between the column 224 and the barge is effected in the same sequence as described in connection with the jacking assembly 16. The yoke 222 of the assembly 220 illustrated in FIGURES 10 and 11 serves an analogous function as the cross head arrangement 50 of the jacking assembly 16. The ball screw shafts 274 for the most part are in either compression or tension with little or no twisting or torsion forces encountered. This is due to the head 249 and axle 248–252 arrangement. The yoke 222 has the added advantage of properly positioning all of the shafts 274 simultaneously and, together with the rollers 240, preventing binding between the jacking structure and the column 224 such as might be caused by wind and wave action. The yoke 222, as explained before, is suitable for columns of the type formed of a cylindrical shell whereas the cross head arrangement 50 has particular utility in connection with columns made up of a series of vertical and horizontal members. The jacking assemblies otherwise are quite similar in structure and operation.

Another modified structure is illustrated in FIGURES 14, 15 and 16. For the most part, this jacking assembly 300 is the same as the jacking assembly 220 in that a yoke 222 is used in connection with a number of jacking units 301. The yoke 222 employs rollers 302 in pairs. Tracks 304 are provided at circumferentially spaced-apart points around the circumference of the column 306 and each includes a guide or bar 308 extending lengthwise vertically along the column 306 and having at spaced-apart intervals a number of holes 310.

Instead of four separate jack assemblies as employed in connection with jacking unit 220, only three separate jacking units 301 are used with the jacking assembly 300, as illustrated in FIGURE 15. The vertically extending ball screw shafts 274 are received by a ball screw nut which is driven by a main drive motor 311 or alternatively a rapid traverse motor 312, each of which turns a worm gear in a gear box 313 associated with the ball screw nut arrangement at 314.

A somewhat different head structure 316 is employed for enagement with the tracks 304. Each head 316 is provided with spaced-apart radially extending guides 318 which receive therebetween the bar 308 for guiding the heads 316 and preventing rotational movement of the yoke 222 around the column 306. The heads 316 otherwise are similar to the heads 246 and are equipped with pins 268 for extension into and retraction from the several holes 310 in the tracks 304.

Jacking units 220 and 300 are adapted for use with different size columns and offshore equipment structure having varying weight requirements. The jacking unit 220, for example, would be more suitably appropriate for use with a barge having a considerable amount of weight and equipment whereas jacking unit 300 is more suitable for lighter offshore barges and columns.

Considerable advantages are provided by the jacking apparatus of this invention, certain ones having been described above. A most significant advantage compared with jacking mechanisms using hydraulic cylinders resides in the exceedingly long stroke obtained by the use of the shaft-screw member arrangement. The shafts can be of sufficient length to readily provide a stroke up to twenty feet. With suitable guide structure, shafts of much longer lengths can be used. As a practical matter, strokes of this length are not available with jacking mechanism which relies on a hydraulic cylinder to effect movement between a column and a platform. Many other advantages will be apparent to those familar with and skilled in this particular art.

I claim:
1. Jacking apparatus for effecting relative vertical movement between a platform and a substantially vertically extending elongated column adapted to support or to be supported by the platform, said jacking apparatus comprising a plurality of jacking units spaced circumferentially of the column, each unit comprising a pair of shaft members extending generally vertically and a pair of nut members each receiving one of the shaft members, said nut members being rotatable with respect to the shaft members whereupon rotation of said nut members, the shaft members are moved vertically, means for mounting the jacking unit on the platform, means for selectively connecting the jacking unit to the column, and power means for rotating the nut members to effect upward or downward relative movement between the column and the platform.

2. Jacking apparatus for effecting relative vertical movement between a platform and a substantially vertically extending elongated column, said jacking apparatus comprising jacking units spaced circumferentially around the column, each unit comprising a pair of vertically extending shafts mounted on the platform for vertical movement with respect thereto, latch means connected with the shafts for movement therewih for connecting the shafts to the column and for releasing the shafts for movement relative to the column, rotatable screw means mounted on the platform providing a driving connection between the platform and the shafts for selectively propelling the pair of shafts together in either vertical direction to effect relative vertical movement between the platform and the column when the latch means connects the pair of shafts to the column.

3. Jacking apparatus as defined in claim 2 further including means extending horizontally between and connecting the shafts, track means extending vertically on the column engageable with the shaft connecting means for guiding the vertical movement of the shafts, said latch means being engageable with said track means.

4. Jacking apparatus as defined in claim 2 wherein the rotatable screw means includes a pair of ball screw nut means rotatably secured to the platform, each receiving one of the shafts and through which the shafts are extendable.

5. Jacking apparatus as defined in claim 4 further including a motor and gear means between said motor and both nut means for rotating said nut means in unison.

6. Jacking apparatus as defined in claim 2 wherein the pair of shafts are connectable with the column through a horizontally extending axis passing through the longitudinal axes of the shafts which connection transmits tension and compresion forces substantially to the shafts along their longitudinal axes.

7. Jacking apparatus as defined in claim 2 wherein the column is provided with track means extending radially between the shafts, said latch means engaging the track means between the shafts.

8. Jacking apparatus as defined in claim 2 further including vertically movable means surrounding the column, and means connecting the shafts of the jacking units to said movable means for movement of said means with the shafts, said latch means being mounted on said movable means.

9. Jacking apparatus as defined in claim 2 further including additional latch means mounted on the platform and engageable with the column to connect the column to the platform independently of the latch means associated with the jacking units.

10. Jacking apparatus for effecting relative vertical movement between a platform and a substantially vertically extending elongated column, said jacking apparatus comprising jacking units spaced circumferentially around the column, each unit comprising a pair of vertically extending shafts, a pair of rotatable screw members mounted on the platform against vertical movement with respect thereto and each receiving one of the shafts in threaded engagement, means for rotating the pair of screw members in unison in opposite rotational directions to move the pair of shafts in one vertical direction, means extending horizontally between the shafts for connecting the shafts and being movable therewith, and latch means on said horizontally extending means for connecting the pair of shafts to the column and releasable from the column for allowing the shafts to move with respect to the column, said latch means including means for connecting the shafts to the column through a horizontally extending means, the longitudinal axis of which is substantially in the vertical plane defined by the shafts to apply forces to the shaft axially thereof.

11. Jacking apparatus as defined in claim 10 wherein the means for rotating the pair of screw members includes first power means for effecting relative movement between the column and the platform when the latch means connects the shafts to the column and second power means for effecting comparatively rapid vertical movement of the shafts when the latch means is released.

References Cited by the Examiner
UNITED STATES PATENTS
2,992,812   7/1961   Rasmussen et al. _____ 254—107

WILLIAM FELDMAN, *Primary Examiner.*

OTHELL M. SIMPSON, *Examiner.*